United States Patent
Chen

(10) Patent No.: US 8,228,022 B2
(45) Date of Patent: Jul. 24, 2012

(54) SOLAR ENERGY CONTROL SYSTEM

(75) Inventor: Yin-Fan Chen, Taipei Hsien (TW)

(73) Assignee: Hon Hai Precision Industry Co., Ltd., Tu-Cheng, New Taipei (TW)

( * ) Notice: Subject to any disclaimer, the term of this patent is extended or adjusted under 35 U.S.C. 154(b) by 1177 days.

(21) Appl. No.: 12/041,680

(22) Filed: Mar. 4, 2008

(65) Prior Publication Data

US 2009/0160395 A1    Jun. 25, 2009

(30) Foreign Application Priority Data

Dec. 19, 2007 (CN) .......................... 2007 1 0203218

(51) Int. Cl.
*H02J 7/00* (2006.01)

(52) U.S. Cl. ........................................................ 320/101

(58) Field of Classification Search .................. 320/101, 320/152, 157–159, 162–164
See application file for complete search history.

(56) References Cited

U.S. PATENT DOCUMENTS

2007/0271006 A1* 11/2007 Golden et al. ................ 700/295

FOREIGN PATENT DOCUMENTS

| CN | 2726267 Y | 9/2005 |
| CN | 101078486 A | 11/2007 |

OTHER PUBLICATIONS

Wang et al. "wireless network automatic control for lamps based on ZigBee technology", telecommunications newsflash, year 2007, pp. 44-46, issue 11.

* cited by examiner

Primary Examiner — Richard V Muralidar
(74) Attorney, Agent, or Firm — Altis Law Group, Inc.

(57) ABSTRACT

A solar energy control system includes a storage battery, a solar energy operated absorption board, a load, a controller, a first ZigBee module, a second ZigBee module, and a monitoring device. The absorption board is connected to the battery for charging the battery. The load is connected to the battery for receiving a working voltage from the battery. The controller is connected to the absorption board to detect a voltage of the absorption board, and control the charging status according to the detected voltage. The first ZigBee module is connected to the monitoring device. The second ZigBee module is connected to the controller. The monitoring device monitors a status of the controller and sends control instructions to the controller through the first and second ZigBee modules.

7 Claims, 2 Drawing Sheets

SOLAR ENERGY CONTROL SYSTEM

BACKGROUND

1. Field of the Invention

The present invention relates to a solar energy control system.

2. Description of Related Art

ZigBee is a mobile communication technology designed to be simpler and less power consuming than other wireless personal area networks (WPANs) such as a Bluetooth network. A ZigBee network generally costs only half as much to build as a typical Bluetooth network because less software and related parts are used, and it is especially ideal for use as a home network.

Conventional solar energy controllers are hardwired. It is common that a solar energy control system will need many controllers, and the network of wiring needed for the controllers is complex and difficult to achieve.

What is desired, therefore, is to provide a solar energy control system with controllers that can be controlled wirelessly.

SUMMARY

An exemplary solar energy control system includes a storage battery, a solar energy operated absorption board, a load, a controller, a first ZigBee module, a second ZigBee module, and a monitoring device. The absorption board is connected to the battery for charging the battery. The load is connected to the battery for receiving a working voltage from the battery. The controller is connected to the absorption board to detect a voltage of the absorption board, and control the absorption board to charge the battery according to the detected voltage. The first ZigBee module is connected to the monitoring device. The second ZigBee module is connected to the controller. The monitoring device monitors a status of the controller and sends control instructions to the controller through the first and second ZigBee modules to control the charging status of the absorption board.

Other advantages and novel features of the present invention will become more apparent from the following detailed description of preferred and exemplary embodiments when taken in conjunction with the accompanying drawings, in which:

DETAILED DESCRIPTION

Figure 1:
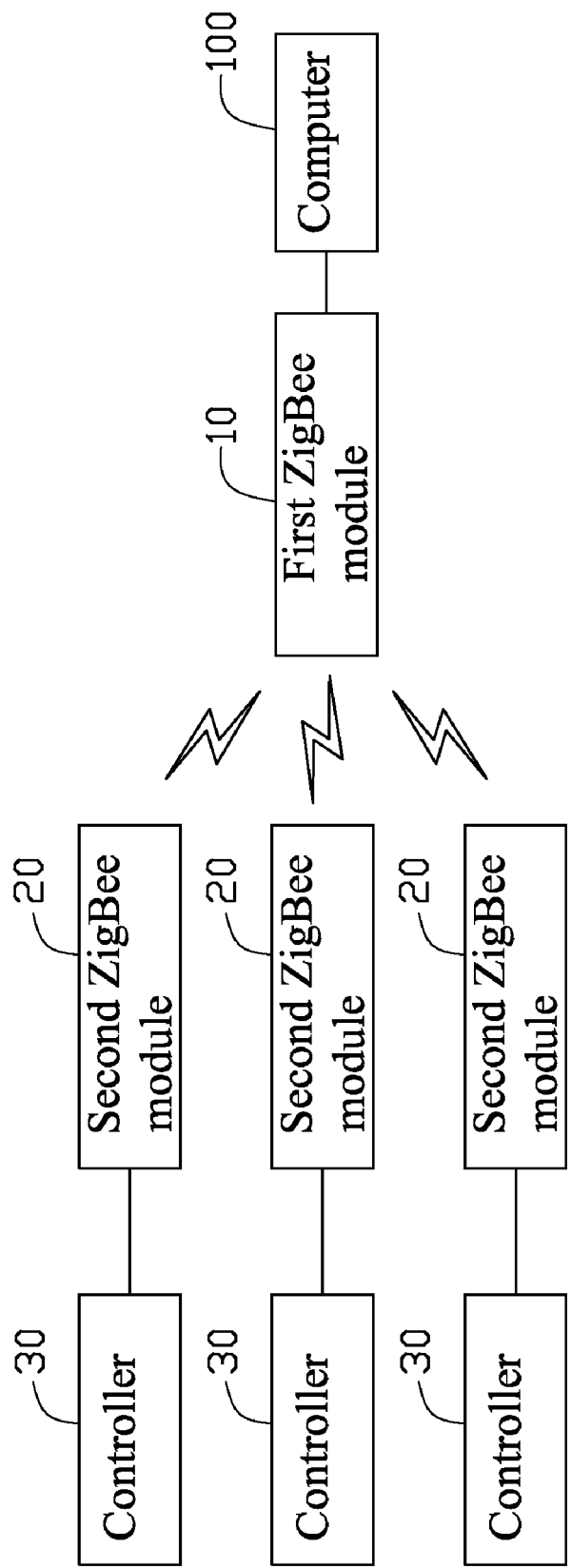
FIG. 1 is a block diagram of a solar energy control system including three controllers in accordance with an exemplary embodiment of the present invention.

Referring to FIG. 1, in an embodiment of the present invention, there are three controllers 30, respectively connected to three second-ZigBee modules 20. When the second ZigBee modules 20 are located within communication range of a first ZigBee module 10, a monitoring device such as a computer 100 connected thereto can control the controllers 30 through the ZigBee network. Other topologies can be selected according to need.

Figure 2:
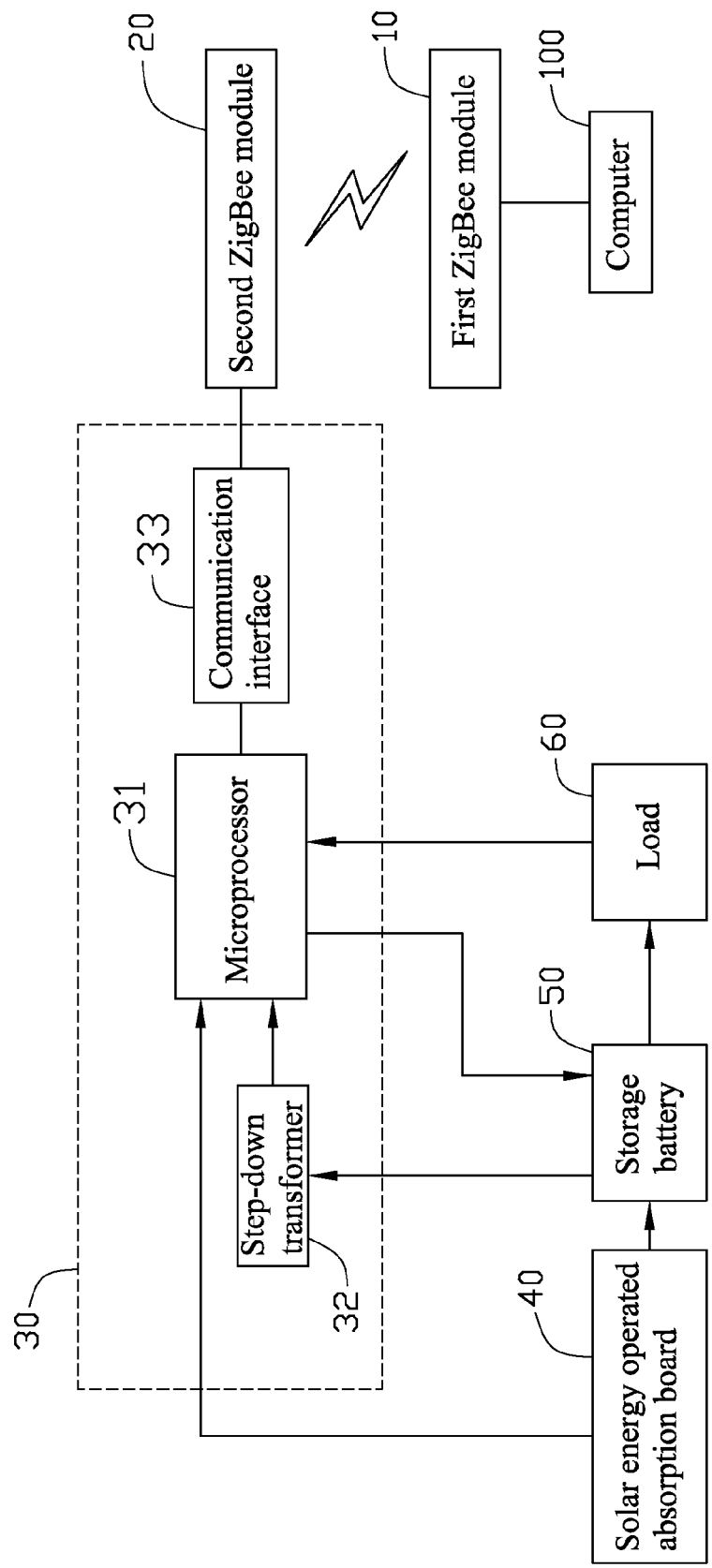
FIG. 2 is a schematic diagram of one of the controllers of FIG. 1 connected to a solar energy operated absorption board, a storage battery, and a load.

Referring to FIG. 2, a schematic of one of the controllers of FIG. 1 connected to a solar energy operated absorption board 40, a storage battery 50, and a load 60 is shown. The controller 30 includes a microprocessor 31, a step-down transformer 32, and a communication interface 33. The communication interface 33 can be any appropriate communication interface such as an RS-232 serial interface.

The absorption board 40 is connected to the battery 50 for charging the battery 50. The battery 50 is connected to the load 60 for providing a working voltage to the load 60. The battery 50 is connected to the microprocessor 31 via the step-down transformer 32. The step-down transformer 32 is connected between the battery 50 and the microprocessor 31 to reduce voltage provided by the battery 50 to an appropriate level, and transmit the reduced voltage to the microprocessor 31. The microprocessor 31 is connected to the absorption board 40 for detecting a voltage of the absorption board 40 and according to the detected voltage to judge which period of time in a day thereby to control a charging status of the absorption board 40 to the battery 50. The microprocessor 31 is connected to the battery 50 and the load 60 to detect a current of the load 60, and control a voltage of the battery 50 provided to the load 60. The microprocessor 31 is connected to the second ZigBee module 20 via the communication interface 33 of the controller 30. The first ZigBee module 10 is connected to the computer 100. The computer 100 monitors a status of the controller 30 and sends control instructions to the controller 30 through the first and second ZigBee modules 10 and 20. The first ZigBee module 10 wirelessly communicates with the second ZigBee module 20.

In this embodiment, the load 60 is a street-lamp. The brightness of the street-lamp 60 can be characterized with one or more brightness states and an off state according to need. For simple disclosure, only one brightness state and the off state are disclosed. When the voltage of the absorption board 40 detected by the microprocessor 31 is high, the microprocessor 31 judges that it is daytime, and controls the absorption board 40 to charge the battery 50. At this time, the microprocessor 31 prevents the storage battery 50 outputting voltage to the street-lamp 60, that is, the street-lamp 60 is in the off state. When the voltage of the absorption board 40 detected by the microprocessor 31 is low, the microprocessor 31 judges that it is nighttime, and controls the battery 50 to provide a working voltage to the street-lamp 60, that is, the street-lamp 60 operates at the brightness state. The time arrangements of the street-lamp 60 and voltage threshold value of the absorption board 40 can be set via the computer 100. The computer 100 receives information of the controller 30 through the first and second ZigBee modules 10 and 20, and sends control instructions to control the controller 30 according to the information.

In this embodiment, the first ZigBee module 10 is a coordinator which is a necessary part in a ZigBee network. The ZigBee module 20 is a router.

The solar energy control system replaces controller hardwire connections with the ZigBee wireless network. The computer 100 receives the status of and sends control instructions to the controllers 30 via the ZigBee wireless network. The time arrangements of the load 60 and the related parameters of the controller 30 can be pre-programmed or manually set in the computer 100. The computer 100 can be connected to any node of the ZigBee network to control the controllers 30.

It is to be understood, however, that even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A solar energy control system comprising:
   a storage battery;
   a solar energy operated absorption board connected to the battery for charging the battery;
   a load connected to the battery for receiving a working voltage from the battery;
   a controller comprising a microprocessor and a communication interface connected to the microprocessor, wherein the microprocessor is connected to the absorption board to detect the voltage of the absorption board and judging a time for day or night to control the absorption board to charge the battery according to the detected voltage;
   a first ZigBee module;
   a second ZigBee module connected to the communication interface; and
   a monitoring device connected to the first ZigBee module, the monitoring device monitoring a status of the microprocessor and sending control instructions to the microprocessor through the first and second ZigBee modules and the communication interface, wherein when the voltage of the absorption board detected by the microprocessor is high, the microprocessor judges that it is daytime and controls the absorption board to charge the storage battery, and at the same time the microprocessor prevents the storage battery outputting voltage to the load; when the voltage of the absorption board detected by the microprocessor is low, the microprocessor judges that it is nighttime and controls the storage battery to provide a working voltage to the load.

2. The solar energy control system as claimed in claim 1, wherein the microprocessor is connected to the battery for receiving the working voltage from the battery.

3. The solar energy control system as claimed in claim 2, wherein the controller further comprises a step-down transformer connected between the battery and the microprocessor for reducing the working voltage of the battery to an appropriate voltage that is provided to the microprocessor.

4. The solar energy control system as claimed in claim 1, wherein the microprocessor is connected to the battery and the load for detecting a current of the load, and controlling the working voltage of the battery provided to the load according to the detected current.

5. The solar energy control system as claimed in claim 1, wherein the communication interface is an RS-485 serial interface.

6. The solar energy control system as claimed in claim 1, wherein the monitoring device is a computer.

7. The solar energy control system as claimed in claim 1, wherein the first ZigBee module is a coordinator, and the second ZigBee module is a router.

* * * * *